United States Patent

Plasko

[11] 3,911,325
[45] *Oct. 7, 1975

[54] MEANS AND METHOD FOR PROTECTING AN OVERHEATING COMMUNICATION UNIT

[75] Inventor: Emil Robert Plasko, Dayton, Ohio

[73] Assignee: Micro Devices Corporation, Dayton, Ohio

[ * ] Notice: The portion of the term of this patent subsequent to Sept. 3, 1991, has been disclaimed.

[22] Filed: June 26, 1974

[21] Appl. No.: 483,229

Related U.S. Application Data

[62] Division of Ser. No. 321,754, Jan. 8, 1973, Pat. No. 3,833,835.

[52] U.S. Cl. .............................. 317/40 R; 317/100
[51] Int. Cl.² .......................................... H02H 5/04
[58] Field of Search ...... 317/13 B, 40 A, 40 R, 9 A, 317/9 AC, 100; 337/186, 203, 327, 380, 381, 414; 315/119, 123, 309

[56] References Cited
UNITED STATES PATENTS
2,710,373  6/1955  Crowell .............................. 317/13 B
3,056,905  10/1962  Rosenfeld .......................... 317/40 R
3,198,914  8/1965  Baran ................................. 337/414
3,309,574  3/1967  Colby ................................ 317/40 R
3,418,531  12/1968  Strachan ........................... 317/40 R
3,833,835  9/1974  Plasko ............................... 317/40 R Primary Examiner—James D. Trammell
Attorney, Agent, or Firm—Candor, Candor & Tassone

[57] ABSTRACT

In an electrically operated communication unit, such as a television set, radio, etc., having an outer casing and electrically operated parts disposed in the casing and being supplied electrical current through power source lines of the unit, the improvement of a thermally responsive device disposed in one of the power source lines to open that line when the device is heated to a certain amount by a malfunctioning and thereby an overheating part of the unit. The thermally responsive device is located adjacent the ventilation openings of the casing so that air flow from inside the casing out through the openings will pass over the device to be sensed thereby.

2 Claims, 1 Drawing Figure

U.S. Patent  Oct. 7,1975  3,911,325
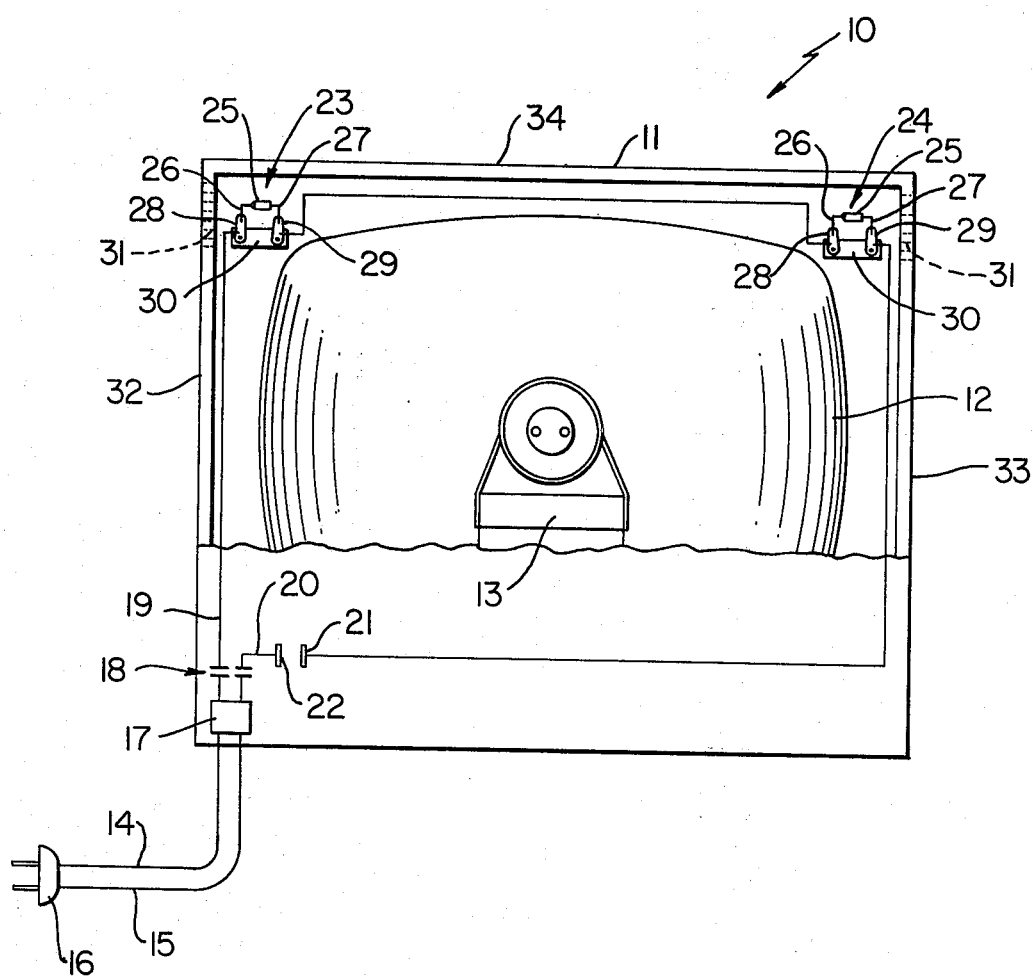

MEANS AND METHOD FOR PROTECTING AN OVERHEATING COMMUNICATION UNIT

This application is a divisional application of Ser. No. 321,754, filed Jan. 8, 1973, now U.S. Pat. No. 3,833,835.

This invention relates to a means and a method for protecting a communication unit, such as a television set, radio, etc., from an overheating condition caused by a malfunctioning of one or more of the electrically operated parts of the unit.

It is well known that electrically operated communication units, such as television sets, radios, etc., each has electrically operated parts disposed in the casing thereof and such parts sometimes malfunction in a manner to overheat and thereby cause a hazardous condition not only from a fire standpoint, but also from an electrical shock standpoint, etc.

It is a feature of this invention to protect such a unit from producing such an overheating condition by automatically terminating the flow of electrical current through such unit before the same overheats to an adverse degree.

In particular, one embodiment of this invention provides a thermally responsive device disposed in one of the power source lines of the communication unit with such device being so positioned that the same will open that line when the device is heated to a certain amount by a malfunctioning of an electrically operated part or parts of the unit. The casing of the communication unit Normally has vent openings provided in the top thereof or adjacent to the top thereof to permit the normally heated air inside the casing to pass out of the same. The thermally responsive device of this invention can be disposed adjacent such vent openings so that the air flow over the same will be sensed by such device. If desired, two such devices can be provided in such power source line in order to tend to insure that the line will be opened with one or more of the parts of the communication unit is malfunctioning and, thus, overheating.

Accordingly, it is an object of this invention to provide an improved electrically operated communication unit, the unit having one or more of the novel features set forth above or hereinafter shown or described.

Another object of this invention is to provide an improved method of making such a communication unit or the like.

Other objects, uses and advantages of this invention are apparent from a reading of the description which proceeds with reference to the accompanying drawings forming a part thereof and wherein:

The drawing schematically illustrates the rear of a television set, partially broken away and containing the protection means of this invention.

While the various features of this invention are hereinafter described and illustrated as being particularly adapted to provide safety means for an electrical operated communication unit, it is to be understood that various features of this invention can be utilized singly or in any combination therewith to provide protection means for other devices as desired.

Therefore, this invention is not to be limited to only the embodiment illustrated in the drawings, because the drawings are merely utilized to illustrate one of the wide variety of uses of this invention.

Referring now to the drawings, the improved electrically operated communication unit of the invention is generally indicated by the reference numeral 10 and comprises a television set having an outer casing or cabinet 11 containing a television picture tube 12 as well as other electrically operated devices 13 which are all adapted to be supplied electrical current from power source lines 14 and 15 when such lines 14 and 15 have the electrical plug 16 thereof plugged into a conventional electrical outlet in a manner well known in the art.

As illustrated, the lines 14 and 15 have a conventional filter 17 therein for filtering out stray pulses and the like and respectively lead from the filter 17 to the main on-off switch means 18 of the unit 10. Thus, the switch means 18 must be turned to the "on" position thereof whereby the lines 14 and 15 respectively interconnect to other power source lines 19 and 20 of the unit 10 that respectively lead to power source terminals 21 and 22 for supplying the electrical circuit (not shown) for all of the electrically operated parts, such as parts 12 and 13 of the unit 10.

The line 19 has one or more thermally responsive devices of this invention disposed therein and two such devices are generally indicated respectively by the reference numerals 23 and 24 in the drawing.

Each device 23 and 24 includes a thermally responsive fuse 25 which may be of the thermally collapsible pellet type, such as disclosed and claimed in the U.S. Pat. No. 3,180,958 to Merrill, wherein the opposed conductors 26 and 27 of the device 25 are electrically interconnected together by the device 25 unless the device 25 senses a certain temperature wherein the device 25 has the pellet thereof collapsed so that electrical current can no longer be provided between the conductors 26 and 27 thereof and the device 25 must be replaced.

As illustrated in the drawings, the conductors 26 and 27 of the device 25 are respectively interconnected to terminals 28 and 29 carried by an insulated board 30 and being respectively disposed in the line 19 so that in order for the current to flow through the line 19, the same must flow through the devices 23 and 24 which are provided in series in the line 19

As previously stated, communication units are normally provided with vent openings or other ventilation means adjacent the top thereof so that the normal heat generated inside the casing thereof during the operation of the unit can readily be dissipated to the atmosphere through such ventilation means.

As illustrated in the drawings, the casing 11 of the unit 10 is provided with a plurality of vent openings 31 on each side 32 and 33 thereof adjacent the top wall 34 of the casing 11 as illustrated. Thus, by positioning the thermally responsive devices 23 and 24 of this invention adjacent such vent openings 31 at each side 32 and 33 of the casing 11 as illustrated, the flow of heated air in the casing 11 will pass over such devices 23 and 24 as the same flows through the vent openings 31 so that the device 23 and 24 readily sense the internal temperature of the casing 11 at all times and are not located in dead air spaces of the casing 11.

The operation of the unit 10 will now be described.

As previously stated, when the user decides to turn on the communication unit 10, the main switch 18 is moved to a closed position thereof to interconnect the power source lines 14 and 15 to the power source lines 19 and 20. If the unit 10 is not malfunctioning, the lines 19 and 20 respectively interconnect lines 14 and 15 to the terminals 21 and 22 that are interconnected to the electrical circuit of the unit 10 so that the unit 10 now functions in a conventional manner for a television set or the like.

However, should one or more of the electrical parts 12 or 13 of the unit 10 begin to malfunction and heat up to a certain degree, such malfunctioning part will heat the air in the casing 11 and as such heated air is being vented out of the vent openings 31 of the casing 11, such heated air flows over the devices 23 and 24 and if the devices 23 and/or 24 are heated to a certain degree, one or both thermally responsive devices 23 and 24 will blow and thereby open the line 19 to thus terminate the flow of electrical current to the terminals 21 and 22 for the unit 10. In this manner the malfunctioning part of the unit 10 is no longer being supplied electrical current and cannot be supplied such current until the blown device 23 and 24 is replaced. However, before such blown device or devices is replaced, the unit 10 can be checked to determine which part had been malfunctioning so that the same can be repaired or replaced before the unit 10 is rendered operative.

Thus, it is believed that by positioning the devices 23 and 24 adjacent the ventilation means 31 of the casing 11 of the unit 10, the devices 23 and 24 will be in the air flow path to sense the temperature inside the casing 11 and open the lines 19 before the heated condition inside the casing 11 rises to an adverse degree.

Thus, it can be seen that this invention not only provides an improved communication unit, but also this invention provides an improved method for making such a unit or the like.

While each device 23 and 24 has been previously described as being a thermally responsive fuse which blows when sensing a certain temperature for a certain period of time, it is to be understood that such fuse could be merely a thermally responsive thermostat which when heated to a certain temperature will open an electrical circuit, but when subsequently cooled, will again complete the electrical circuit so that the same will not be a throw-away device once the circuit has been opened thereby, but still would be a thermal limiter under the control of the heat inside the casing 11 of the unit.

Therefore, the term "termally responsive device" is intended to cover not only fuses, thermostats, etc., but also other means for opening circuits through the sensing of a certain temperature for a certain period of time whether such time period be substantially instantaneous or delayed.

While the form and method of this invention now preferred have been described and illustrated as required by the Patent Statutes, it is to be understood that other forms and methods can be utilized and still come within the scope of the appended claims.

What is claimed is:

1. In a method of making an electrically operated communication unit having an outer casing and electrically operated means disposed in said casing and being supplied electrical current through power source lines of said unit, the improvement comprising the steps of forming ventilation means through said casing of said unit in an upper part of said casing so that said ventilation means is disposed above said electrically operated means disposing a thermally responsive device in said casing and close to said opening means so that air heated by said electrically operated means will naturally rise therefrom and flow from inside said casing over said device and then immediately out through said opening means, and disposing said thermally responsive device in one of said lines to open that line when said device is heated to a certain amount by a malfunctioning electrically operated means of said unit.

2. In a method of making an electrically operated communication unit as set forth in claim 1, the further improvement comprising the steps of forming said casing with another vent opening means remote from the first-named opening means, and disposing another thermally responsive device in said one line so that said other device is disposed adjacent said other vent opening means.

* * * * *